United States Patent
Dent

[11] 3,736,805
[45] June 5, 1973

[54] TOOTHED BELTS
[75] Inventor: Michael Dent, Healdgreen, England
[73] Assignee: Dunlop Holdings Limited, London, England
[22] Filed: Apr. 27, 1971
[21] Appl. No.: 137,889

[30] Foreign Application Priority Data
May 2, 1970 Great Britain.....................21,194/70

[52] U.S. Cl.....................74/237, 74/231 C, 74/239, 156/137, 156/139
[51] Int. Cl..............................F16g 1/22, F16g 1/28
[58] Field of Search....................74/237, 231 E, 239; 156/460, 137-141

[56] References Cited
UNITED STATES PATENTS

| | | | |
|---|---|---|---|
| 3,498,684 | 3/1970 | Hallaman | 74/237 X |
| 3,607,499 | 9/1971 | Garbin | 156/137 |
| 2,792,319 | 5/1957 | Fine | 74/231 R |
| 2,444,583 | 7/1948 | Stewart et al. | 74/237 |
| 2,233,294 | 2/1941 | Merrill et al. | 156/139 |

Primary Examiner—Leonard H. Gerin
Attorney—Stevens, Davis, Miller & Mosher

[57] ABSTRACT

A toothed belt comprising a continuous strip of elastomeric material having embedded therein at least one wire reinforcing cord comprising at least one bunch of fine gauge metal filaments, of which the following is a specification.

20 Claims, 4 Drawing Figures

PATENTED JUN 5 1973 3,736,805

FIG.3.
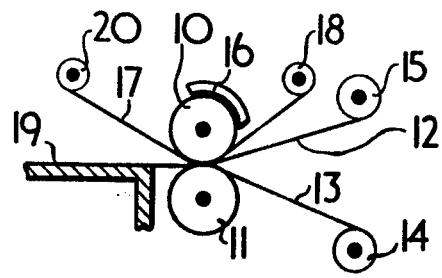
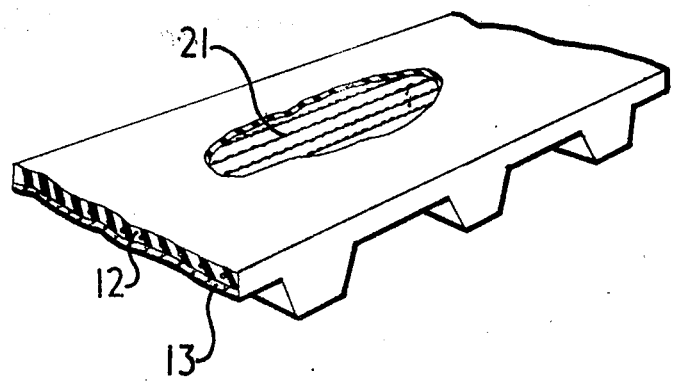
FIG.4

TOOTHED BELTS

This invention relates to toothed transmission belts, and particularly to such belts with fine wire reinforcement.

It has been proposed to reinforce toothed belts with fine wires, the wires being in the form of conventional cords. Such belts are appreciably less flexible than textile cord belts and with belts for drives having small diameter pulleys, early breakdown can occur due to "fretting" corrosion induced by excessive flexing. In consequence wire reinforced belts are not normally recommended for small compact drive systems.

Also, belts with wire cord reinforcement, as a consequence of their stiffness, are easily and permanently distorted if bent to a small radius. Such bending produces a kink in the belt and a subsequent lack of smoothness in movement when the belt is running.

Belts reinforced with a single spiral layer of conventional wire cords tend to assume the spirality of the layer. Thus such a belt does not assume a straight, parallel track when running. The provision of side guides on a pulley wheel will induce correct alignment but will also cause greater wear to the edge of the belt.

Because of these disadvantages, conventional wire cord reinforced belts have not been applied very successfully to the relatively small drives which constitute a major proportion of toothed belt usage. For such small drives, increased tensile strength has been obtained by the use of glass yarns. However, the use of glass reinforcement requires the provision of special precautions and processes in order to secure adhesion to the elastomer and to avoid breakdown of the yarn under high speed flex conditions.

One object of the present invention is to provide an improved form of toothed transmission belt.

According to one aspect of the present invention a toothed belt comprises a continuous strip of elastomeric material having embedded therein at least one wire cord extending longitudinally with respect to the belt and comprising at least one bunch of fine gauge metal filaments.

According to another aspect of the invention the metal filaments have a diameter in the range 0.0005 of an inch to 0.003 of an inch.

According to a further aspect of the present invention the metal filaments have a diameter in the range 0.0005 of an inch to 0.002 of an inch.

Conventional steel wire cords are generally composed of a number of strands each strand consisting of a number of steel wires which are laid around each other on a wire-cabling machine. We have, however, discovered that wire cords may be economically produced in which the strands are composed of bunches of wires. In this specification the term "bunch" is used to mean a multiplicity of substantially parallel wires.

Thus in the cord utilized in the toothed belt according to the invention the wires in any one strand will not maintain the same relative position with respect to the axis of the strand throughout the length of the cord. This is in contrast to those in the usual type of strand formed by laying together the individual wires to form a cabled construction.

Compared with conventional cabled wire cords, having filament diameters, for example, of 0.004 of an inch or more, the wire cord reinforcement for a toothed belt according to the present invention has a similar modulus of elasticity but a reduced flexural modulus. This is achieved by using fine metal filaments which are, for example, of generally less than 0.004 of an inch in diameter and are in bunched form, providing a reduction in stress at a given load, and an increase in belt life.

Another object of the invention is to provide a method for the manufacture of a toothed belt having embedded therein at least one wire cord formed from fine gauge metal filaments.

According to another aspect of the invention a method for the manufacture of a toothed belt comprises passing a sheet of unvulcanized elastomeric material and a sheet of stretchable fabric through the nip of a pair of rollers, one of which is a forming roll formed with a series of circumferentially extending grooves having the required belt tooth profile, the other roll being a pressure roll, applying the composite sheet thus formed to a mould having a toothed profile complementary to that of the profiled composite sheet, winding around the radially outer surface of the composite sheet at least one tension layer of wire cord comprising a bunch of fine gauge metal filaments, applying a covering layer of elastomeric material over the tension layer, and moulding and vulcanizing the assembly.

Preferably the reinforcement is in the form of a wire cord produced by cabling together two or more strands. Each strand comprises a bunch of substantially parallel (non-cabled) fine gauge metal filaments and the bunch is subsequently twisted about its own axis prior to cabling. Alternatively each strand may comprise an untwisted bunch of metal filaments.

In another arrangement the reinforcement may be in the form of a doubled wire cord. The doubled wire cord is formed from two or more strands of twisted bunches of fine gauge metal filaments, and the strands are doubled together so as to follow intertwined helical paths. A non-cabled wire cord of this kind may be made on conventional textile doubling machinery.

A particularly suitable wire cord for use in a toothed belt, and a method of manufacture of a toothed belt will now be described with reference to the accompanying drawings in which:

FIG. 3 is a side view of an apparatus for forming a toothed belt in accordance with the present invention, and FIG. 4 is a perspective view of a moulded composite sheet, partly cut away to show the wire cord reinforcement.

Figure 1:
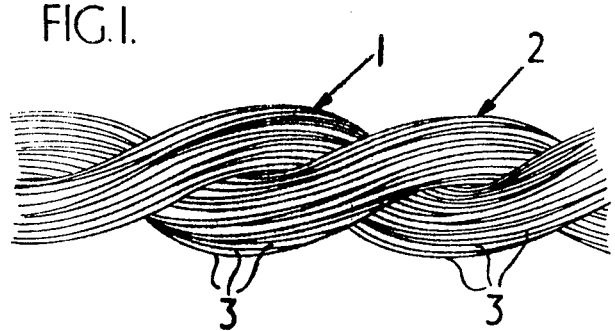
FIG. 1 is a side view of a doubled cord
Figure 2:
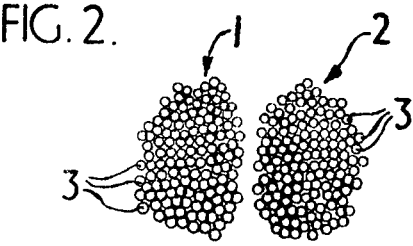
FIG. 2 is a section through the cord shown in FIG. 1

The double wire cord shown in FIG. 1 and FIG. 2 comprises two strands 1 and 2 each formed from a bundle of fine gauge metal filaments 3. In manufacture each bunch of substantially parallel metal filaments is twisted in a similar sense about its own axis and the strands 1 and 2 formed from the twisted bunches are twisted together in an opposite sense so as to produce the doubled wire cord. FIG. 2 shows how the strands 1 and 2 formed from a non-cabled bunch of metal filaments 3 have a slightly flattened shape when formed into a wire cord and also shows how the filaments of each strand are randomly arranged therein.

One method of the manufacture of a toothed belt reinforced with another type of wire cord formed from bunched metal filaments will now be described with reference to FIG. 3 and FIG. 4 of the accompanying drawings.

A performing apparatus for the toothed portion of a positive drive belt is illustrated in FIG. 3 and comprises a plain pressure roll 10 and a grooved preforming roll 11 arranged so that a sheet of rubber 12 and a sheet of fabric 13 can be passed through a nip between the rolls. The composite sheet is formed by passing nylon fabric 13, stretchable in the weft direction only, from a stock roll 14 through the nip between the rolls 10 and 11 together with a strip of calendered neoprene sheet 12 fed from a stock roll 15. The preforming roll 11 is provided with circumferential grooves corresponding in depth and pitch to the depth of the eventual belt teeth, and the pressure roll 10 is heated by a heater 16 so that it warms the neoprene sheet in its passage through the nip to enable it to be forced more easily into the circumferential grooves of the performing roll. The nylon fabric passes through the nip adjacent the preforming roll, the neoprene sheet passing adjacent the pressure roll, from which it is separated by a sheet of release film 17 fed from a stock roll 18.

During the preforming operation the nylon fabric 13 and neoprene compound 12 are pressed together, the nylon fabric being stretched to cover the profile of the teeth formed in the neoprene compound. The composite sheet emerges from the nip of the rolls 10 and 11 as a longitudinally ribbed sheet 19 in which the ribs are completely filled with neoprene compound and in which a thin film of compound covers the fabric between the ribs. The release film 17 is wound on to a roll 20.

The preformed sheet 19 is then cut into strips of appropriate width so as to encircle a cylindrical toothed forming mould having grooves on its outer cylindrical surface extending parallel to the axis of the mould. Each strip of the composite sheet is fitted around the mould and the ends of the strip are joined together at the base of a tooth-forming groove in the mould.

The mould, having the preformed rubber/fabric toothed portion in position thereon is then fitted to a building mandrel of a cord-laying machine which is operated to spin around the assembly brass plated steel wire cords having a three stranded construction, each strand comprising 186 metal filaments each of 0.0016 of an inch diameter. The wire is applied in sections across the width of the mould, each section being of the appropriate width to form a single belt and the wire in each section being applied at touch pitch. Adjacent sections are separated by a narrow space traversed by the wire at a wider pitch so as to leave an unreinforced gap between the individual belt sections.

A coating of flexible neoprene cement is then applied to the wires and the exposed surfaces of the composite strip, and allowed to dry. The wires crossing the spaces between individual belt sections are then removed and the entire surface of the assembly is covered with a thin layer of unvulcanized neoprene compound of the type incorporated in the composite sheet. FIG. 4 shows in perspective the complete assembly of the composite sheet formed with the wire cords 21 substantially at right angles to the direction of the toothed portions.

The complete assembly of the composite sheet is then removed, still on the mould, from the cord laying machine and placed in a conventional vulcanizing apparatus in which the assembly is heated and radially inward pressure is applied by an encircling diaphragm to mould and vulcanize the belt sections carried on the mould. After vulcanization the belt assembly is removed from the mould and fitted to the mandrel of a cutting machine in which it is divided into individual belts by cutting through the spaces between the belt sections.

The particular method of manufacture described above has the advantage that preformed composite sheet is formed continuously, leading to considerable economies in production. The sheet can readily be cut into strips of any appropriate width according to the size of the mould and the size of the belt.

A toothed belt according to the present invention, in which the belt is provided with a wire cord formed from strands of non-cabled fine gauge metal filaments, has the advantage over conventional belts of being less stiff and therefore not so easily distorted or kinked if bent to a small radius. Furthermore in a belt of this construction there is a reduction in the rate of "fretting" corrosion between the filaments and, in consequence, an increase in the life of the belt.

Having now described my invention – what I claim is:

1. A toothed belt comprising a continuous strip of elastomeric material having embedded therein at lease one wire cord extending longitudinally with respect to the belt and comprising at least one bunch of fine gauge metal filaments, said filaments being of a diameter in the range 0.0005 of an inch to 0.003 of an inch.

2. A toothed belt according to claim 1 wherein the metal filaments have a diameter in the range 0.0005 of an inch to 0.002 of an inch.

3. A toothed belt according to claim 1 wherein the wire cord comprises two or more strands, each strand being formed from a bunch of fine gauge metal filaments.

4. A toothed belt according to claim 1 wherein a strand of the wire cord comprises a twisted bunch of fine gauge metal filaments.

5. A toothed belt according to claim 3 wherein a strand of the wire cord comprises an untwisted bunch of fine gauge metal filaments.

6. A toothed belt according to claim 1 wherein the wire cord is a doubled cord.

7. A toothed belt according to claim 6 wherein the wire cord contains only two strands.

8. A toothed belt according to claim 1 wherein the wire cord comprises a number of strands of fine gauge metal filaments, the strands being laid around each other or around a core.

9. A toothed belt according to claim 1 in which the fine gauge metal filaments are of circular cross-section.

10. A toothed belt according to claim 1 in which the fine gauge metal filaments are of non-circular cross-section.

11. A toothed belt according to claim 1 in which the fine gauge metal filaments are steel filaments.

12. A toothed belt according to claim 11 in which the wire cord is a brass plated steel cord.

13. A method for the production of a toothed belt comprising passing a sheet of unvulcanized elastomeric material and a sheet of stretchable fabric through the nip of a pair of rollers, one of which is a forming roll formed with a series of circumferentially extending grooves having the required belt tooth profile, the other roll being a pressure roll, applying the composite sheet thus formed to a mould having a toothed profile complementary to that of the profiled composite sheet, winding around the radially outer surface of the composite sheet at least one tension layer of wire cord comprising a bunch of fine gauge metal filaments, applying a covering layer of elastomeric material over the tension layer, and moulding and vulcanizing the assembly.

14. a method according to claim 13 wherein the fine gauge metal filaments each have a diameter in the range 0.0005 of an inch to 0.003 of an inch.

15. A method according to claim 13 wherein the fine gauge metal filaments each have a diameter in the range 0.0005 of an inch to 0.002 of an inch.

16. A method according to claim 13 including the step of winding at least one spiral layer of wire cord around the radially outer surface of the composite sheet, as a tension layer.

17. A method according to claim 13 wherein the tension layer of wire cord is applied in sections across the width of the mould, each section being of the appropriate width to form a belt.

18. A method according to claim 17 wherein the adjacent sections are separated by a narrow space traversed by the cord at a wider pitch than the pitch of the cord in the sections, to leave an unreinforced gap between the sections.

19. A method according to claim 17 wherein the wire cord in the sections is applied at touch pitch.

20. A method according to claim 13 applied to the manufacture of a toothed belt according to claim 1.

* * * * *